United States Patent [19]

Gedig et al.

[11] 4,189,957
[45] Feb. 26, 1980

[54] ARRANGEMENT FOR ARRESTING A SEAT OF A VEHICLE

[75] Inventors: Alfred Gedig; Burckhard Becker; Heinz Bauer, all of Solingen, Fed. Rep. of Germany

[73] Assignee: C Rob Hammerstein GmbH, Solingen, Fed. Rep. of Germany

[21] Appl. No.: 919,949

[22] Filed: Jun. 28, 1978

[30] Foreign Application Priority Data

Jul. 1, 1977 [DE] Fed. Rep. of Germany ....... 2729770

[51] Int. Cl.² ...................... G05G 5/06; F16M 13/00; A47C 1/02
[52] U.S. Cl. ........................ 74/535; 74/536; 74/537; 248/424 X; 297/344
[58] Field of Search ............... 297/344; 248/424, 429, 248/430, 393; 74/533, 535, 536, 537, 538

[56] References Cited

U.S. PATENT DOCUMENTS

| 2,066,557 | 1/1937 | Cox .................................. 248/424 |
| 2,126,143 | 8/1938 | Saunders et al. ................. 248/429 |
| 2,598,133 | 5/1952 | Roesch ............................ 74/537 X |
| 2,951,527 | 9/1960 | Wassilieff ........................ 297/344 |
| 3,450,425 | 6/1969 | Leonhardt ...................... 74/533 X |
| 3,507,472 | 4/1970 | Agee et al. ..................... 248/429 |
| 3,756,094 | 9/1973 | Mauron .......................... 248/429 X |

FOREIGN PATENT DOCUMENTS

| 177682 | 2/1954 | Austria ........................................ 74/535 |
| 626327 | 2/1936 | Fed. Rep. of Germany ........... 248/424 |
| 858362 | 12/1952 | Fed. Rep. of Germany ........... 248/430 |
| 2233915 | 1/1973 | Fed. Rep. of Germany ........... 248/393 |
| 2426900 | 12/1974 | Fed. Rep. of Germany ........... 248/429 |
| 2437172 | 4/1975 | Fed. Rep. of Germany ........... 248/393 |
| 2559653 | 6/1977 | Fed. Rep. of Germany ........... 248/393 |
| 1188953 | 9/1949 | France ....................................... 74/536 |
| 2237449 | 3/1975 | France ...................................... 248/424 |
| 29014 | of 1913 | United Kingdom ..................... 248/429 |
| 1079872 | 8/1967 | United Kingdom ..................... 248/429 |

*Primary Examiner*—Leslie Braun
*Attorney, Agent, or Firm*—Michael J. Striker

[57] ABSTRACT

An arrangement for arresting a seat of a vehicle includes an elongated stationary element which is provided with a row of separate recesses being arranged on the element so as to correspond to a plurality of possible positions of the seat. At least two blocking elements are provided for joint movement to a rest position in which the seat is free to move lengthwise of the row of recesses; each of the blocking elements is movable independently of the other from the rest position to an arresting position in which the blocking elements are inserted in respective recesses independently of one another to thereby prevent further movement of the seat.

16 Claims, 8 Drawing Figures

ARRANGEMENT FOR ARRESTING A SEAT OF A VEHICLE

BACKGROUND OF THE INVENTION

The present invention relates to an arrangement for arresting a movable member.

More particularly, the present invention relates to an arrangement for arresting a seat of a vehicle.

It is known in the motor vehicle art to arrange a safety belt directly on a seat of a vehicle. In this case the position of the safety belt depends on the position of the seat. Therefore, it is essential to ensure reliable arresting of the seat in any of its positions, especially in case of an accident where the requirements as to the arresting of the seat in its position and as to the operating reliability of an arrangement for arresting the seat, are put to a severe test.

It is also known in the art to provide both sliding elements of the movable seat with a separate member for arresting the seat in a desired position. Usually both such arresting members are actuated by a single manual lever. There might, however, be a situation where due to either assembly inaccuracies or distortion (e.g., twisting) of the seat, only one of the arresting members actually engages with a cooperating fixed element whereas the other one does not. If this is the case, the non-engaged arresting member merely abuts against the cooperating fixed member without actually engaging the latter. If an accident occurs under these circumstances, the seat of the vehicle is fixed in its position only by one of two arresting elements, the one which has properly engaged the corresponding fixed member. Obviously, such a situation can result in very undesirable consequences.

During an accident, the seat of the vehicle is subject to considerable acceleration relative to the chassis of the vehicle, if the seat is not reliably fixed to the base of the vehicle against such relative movement. For example, when a head-on collision at the speed equal to 50 km/h occurs, an acceleration equal to about twenty times gravity is observed, i.e., on the magnitude of approximately 200 m/sec$^2$. Under such magnitudes of acceleration, the speed of movement of the fixed seat guide rails of the chassis and the sliding rails of the seat relative to one another increases considerably within a very short time. The known arresting arrangements are not of such construction as to permit, under such conditions, the arresting member which is not in engagement with the fixed element, to become engaged therewith sufficiently to stop the movement of the seat relative to the chassis.

SUMMARY OF THE INVENTION

It is a general object of the present invention to avoid the disadvantages of the prior art.

More particularly, it is an object of the present invention to provide such an arrangement for arresting a seat of a vehicle, which can reliably arrest the seat in its position, regardless of the dexterity of the driver of the vehicle, and independently of any inaccuracies of the arresting arrangement either due to manufacturing errors or due to accident-related causes.

In pursuance of these objects and others which will become apparent hereafter, one feature of the present invention resides in providing an arrangement for arresting a movable member, particularly a seat of a vehicle, which arrangement includes an elongated stationary element which has a row of separate recesses which are arranged on the element so as to correspond to a plurality of possible positions of the movable member. The arrangement is further provided with means for arresting the movable member in a desired position. The arresting means include at least two blocking elements movable jointly to a rest position in which the member is free to move lengthwise of the row and each movable independently of the other to an arresting position in which the blocking elements are inserted in respective ones of said recesses independently of one another to thereby prevent further movement of the movable member. The arrangement is further provided with means for actuating said blocking elements so as to displace them independently of one another from said rest position into said blocking position to arrest the movable member. Alternately, said actuating means displace the blocking elements jointly from said blocking position into said rest position to thereby set the movable member free to move.

Such an arrangement ensures that after the arresting means are released, for example upon releasing a hand lever which is operative to actuate the arresting means, primarily at least one blocking element is in engagement with a corresponding recess of the stationary element. However, there might be a situation where both the blocking elements fail to engage the stationary element. The distance of at least one of the blocking elements from a corresponding recess on the stationary element is always so small however, that this blocking element will fall into the recess immediately after accident-related acceleration begins.

In accordance with the present invention, the intermediate distance between two adjacent recesses (that is, the spacing of the recesses) measured in direction lengthwise of the movement of the movable member, is equal to the sum of the length of a web portion between two adjacent recesses and double length of a blocking element measured in the same direction. The intermediate space between two blocking elements plus double the length of one blocking element will give, in accordance with the invention, the intermediate space between the corresponding end faces of a recess in the same direction. Thus, upon releasing the actuating member of the arrangement at least one blocking element is positively in engagement with a recess of the stationary element. The essential feature of the present invention resides in completely eliminating any movements of the seat relative to the stationary element when both blocking elements are in engagement with the stationary element.

In accordance with another advantageous feature of the present invention each sliding element is provided with two parallel stationary elements which have the corresponding dimensions, that is, the distance between two adjacent recesses of the stationary elements is equal to the sum of the length of a web connecting these two recesses plus double the length of a blocking element measured in direction lengthwise of the movement of the movable member. Such an arrangement renders it possible to provide both blocking elements with the same dimensions.

In accordance with an advantageous embodiment of the present invention, the blocking elements are arranged immediately close to each other in form of a set of a plurality of blocking elements. The length of one of the blocking elements in such a set, measured in the direction of movement of the movable member, is somewhat smaller than half of the intermediate distance between two adjacent recesses, whereas the overall length of the set measured in the same direction is larger than a value of the spacing of the recesses. Regardless of the position of the stationary elements relative to one another, such an arrangement ensures reliable arresting of the movable member immediately after the actuator of the blocking elements is released.

It is further suggested to connect the seat of the vehicle with the chassis of the vehicle through a spring. Due to such a provision, a contact flank of a blocking element is always located on the stationary element. The spring urges the seat forward in direction lengthwise the movement of the vehicle, so that any further errors in engagement of the blocking element with the stationary element are eliminated immediately after the seat is loaded, or the vehicle starts moving.

The novel features which are considered as characteristic for the invention are set forth in particular in the appended claims. The invention itself, however, both

DESCRIPTION OF THE PREFERRED EMBODIMENTS

Figure 1:
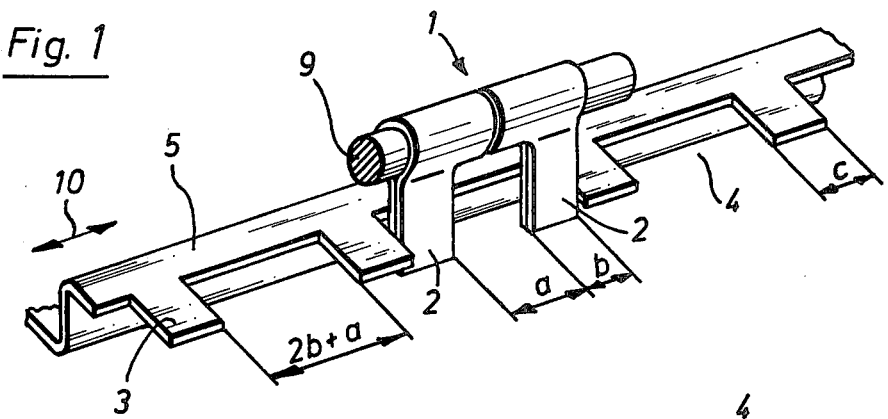
FIG. 1 is a perspective view of an arrangement for arresting a seat of a vehicle, in accordance with the present invention.

Referring now to the drawings and first to FIG. 1 thereof, it may be seen that the reference numeral 1 designates a body rigidly connected to a seat (not shown) of a vehicle. The seat and body 1 are movable on a stationary support 5 in the direction designated by an arrow 10. The support 5 is provided with projections 3 and recesses 4 arranged one after another and spaced from one another by the same distance. An arrangement for arresting the movable seat includes two blocking elements 2 pivotably mounted on a shaft 9 for pivoting around the latter between a first position where the blocking elements 2 are out of engagement with recesses 4, and a second position where the blocking elements 2 engage the recesses 4 (as shown in FIG. 1), thereby preventing further lengthwise movement of the movable seat with the body 1 along the support 5. The blocking elements 2 are so arranged on the shaft 9 that they can pivot about the shaft independently of one another by an angle of approximately 90°. Therefore each blocking element 2 can move independently of the other from a first position to a second position, that is into engagement with the recesses 4; however, both blocking elements 2 can be withdrawn jointly from the recesses 4 (that is from the second position) by pivoting with the shaft 9 into the second position. For this purpose the elements 2 and shaft 9 are provided with suitable cooperating abutments (not shown).

Each blocking element 2 is provided with a leg spring 8, which is mounted on the shaft 9 and normally urges the blocking element into the second position, that is into engagement with the recesses 4. As mentioned before, the shaft 9 is provided with an abutment (not shown) which is operative on turning of the shaft 9 to withdraw the blocking elements 2 from engagement with the recesses 4 into the first position. The displacement of the blocking elements 2 from the second position into the first position is carried out against the urging action of the spring 11.

The blocking elements 2 shown in FIG. 1 have the same dimensions, and the dimensions of the blocking elements 2, of webs 3 connecting the recesses 4 and of the recesses 4 measured in direction of the arrow 10 are interrelated with one another. The length of the blocking element 2 measured in the above-mentioned direction is designated in FIG. 1 by b, the intermediate space between two blocking elements 2 is designated by a. The sum of the intermediate space between two blocking elements 2, that is a, plus double the length of the blocking elements 2, that is 2×b, corresponds to the length of the recess 4 measured in the same above-mentioned direction and is designated by 2b+a. In addition, the intermediate dimension between two blocking elements 2 corresponds to the length of the web 3 between two adjacent recesses 4, that is c. In other words, a=c.

Such an interrelation of the dimensions render it possible to have at least one blocking element 2 engaged with a corresponding recesses 4, immediately when the actuator of the blocking elements 2 is released, and this is true for each and every position of the body 1 relative to the support 5. Therefore, the very possibility of having the blocking elements 2 not engaged with a recess 4 is precluded. The intermediate distance between the blocking elements 2, that is the value a, may also exceed the length of the web 3, that is the value c. If this is the case, the period of the recesses exceeds that when a=c, by a value of a>c.

Figure 2:
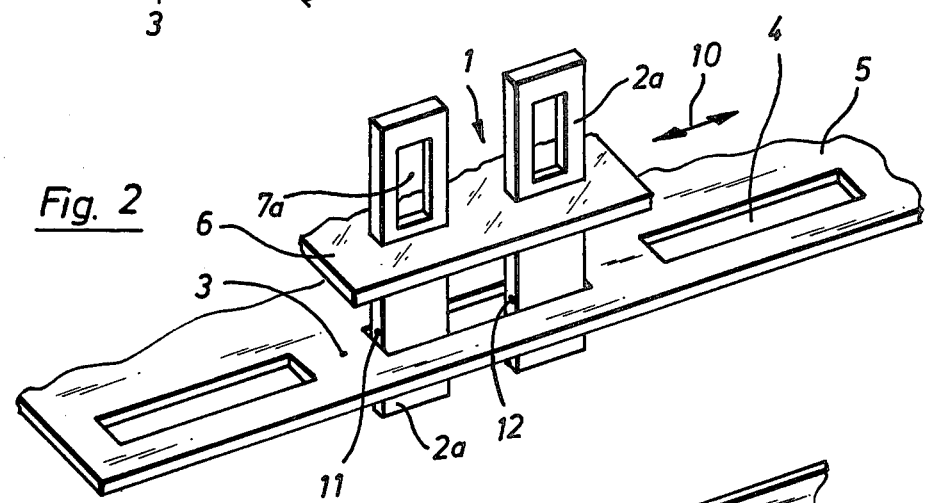
FIG. 2 is a perspective view of a second embodiment of the arrangement for arresting a seat of a vehicle.

Another embodiment of the arrangement for arresting a seat of a vehicle is shown in FIG. 2, where the dimensions of the blocking elements 2a, the webs 3 measured in the direction of arrow 10 stay in the same interrelation with one another as that mentioned above. The blocking elements 2a are formed as slide bars, which are mounted in corresponding slots provided in a plate 6. The slide bars 2a are shown in FIG. 2 in the second position, that is, in engagement with the recess 4, so that the end faces 11 and 12 of the slide bars 2a abut the corresponding end faces of the recess 4.

Inasmuch as the intermediate dimension between two slide bars 2a is equal to the length of the web 3 between two adjacent recesses 4, both slide bars 2a can be positioned to engage their corresponding inner end faces 12 with the corresponding end faces of one and the same web 3 from both sides thereof. Thus, the blocking elements 2a can engage the recess 4 in the mentioned above second engaging position which differs from that shown in FIGS. 1 and 2. Such a second engaging position corresponds to movement of the seat by a distance equal to a+b, in which the seat is arrested from movement in either direction relative to the support 5.

Actuation of the blocking elements 2a is accomplished through a handle positioned in elongated slots 7a of the elements 2a. The corresponding intermediate distance of the slots 7a exceeds somewhat the value of depth of inserting the elements 2a into the recess 4. It is to be understood that any other different types of actuators can be employed for this purpose.

In accordance with another embodiment of the arrangement for arresting a seat of a vehicle (see FIG. 3) the blocking elements 2b are formed as cylindrical pins, which have frustum-like front end portions 12b. The recesses 4 have oval cross-section. Each blocking element 2b is provided with a coil spring 8b, normally urging the blocking elements 2b towards the recesses 4 on the support 5. The intermediate distance between two blocking elements 2b, that is value a, equals the length of the web 3, that is value c, measured in direction lengthwise of the recesses 4. The period of the window-like recesses 4 equals the sum of double the length of a blocking element 2b, that is the value b, and the length of the web 3, that is the value c, between two adjacent recesses 4.

Figure 3:
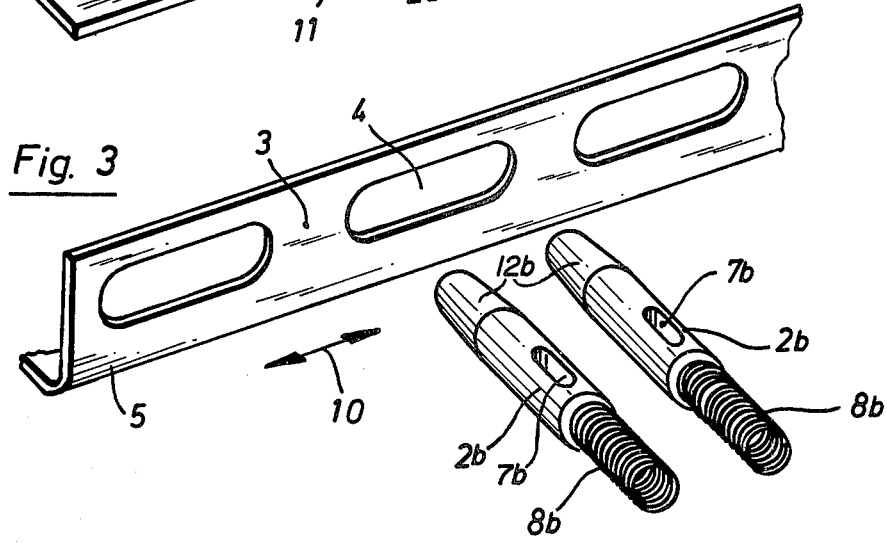
FIG. 3 is a perspective view of a third embodiment of the arrangement for arresting a seat of a vehicle.

It is valid for all embodiments shown in FIGS. 1-3, that at least one blocking element 2 engages a corresponding recess 4 immediately after the actuator is released, which results in arresting the seat with the body 1 in a desired position corresponding to one of the recesses 4 which is engaged with the blocking element (2a and 2b). If this is the case, that is if only one blocking element 2 engages a recess 4, the arresting arrangement can move either by a distance corresponding to the length of the blocking element 2 to permit another blocking element to engage with the same recess 4, or by a distance corresponding to the intermediate distance between two elements 2, that is value a, to permit two blocking elements 2 to engage with one and the same web 3 connecting two adjacent recesses 4. In both cases the seat with the body 1 will be arrested in its position.

The second blocking element 2 will engage the recess 4, in one or another arresting position, immediately once the vehicle is accelerated or decelerated. It is also possible to arrange the support 5 in a position inclined relative to the base of the vehicle, so that the weight of a passenger can be used to make the second blocking element engage the recess 4 of the stationary element 5.

The seat of the vehicle can be connected to the chassis of the vehicle by a spring.

Figure 4:
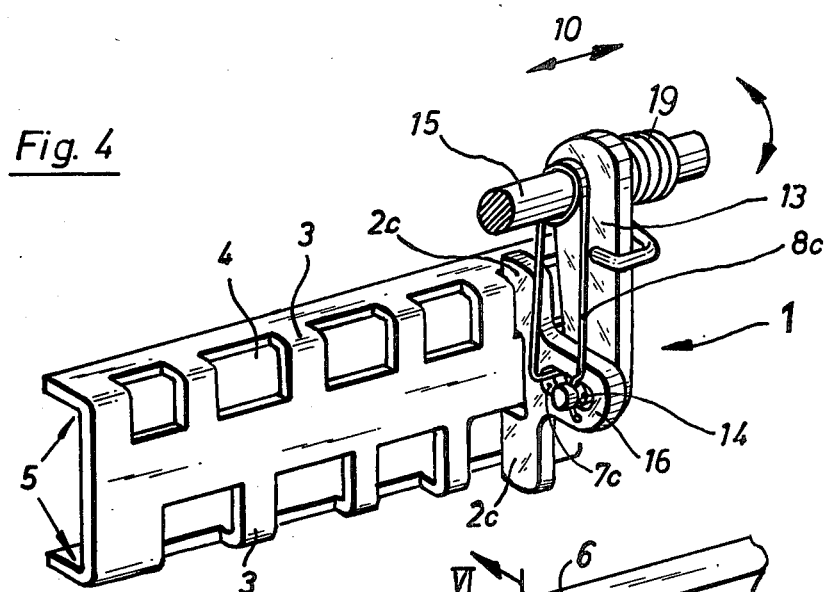
FIG. 4 is a perspective view of a fourth embodiment of the arrangement for arresting a seat of a vehicle.
Figure 5:
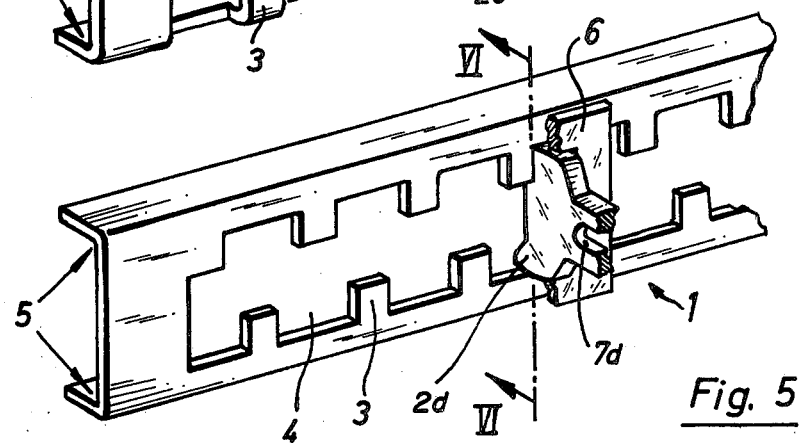
FIG. 5 is a perspective view of a fifth embodiment of the arrangement for arresting a seat of a vehicle.

In accordance with another embodiment shown in FIGS. 4 and 5 two blocking elements 2c and 2d are integrally connected with one another, thus defining an arresting body 16. The upper blocking element 2c and 2d of the arresting body 16 engages the recess 4 in the upper support 5. The lower blocking element 2c and 2d of the body 16 engages the corresponding recess 4 in the lower support 5. Both supports 5 belong to the same arresting arrangement. The recesses 4 and webs 3 of both parallel supports 5 are phase-opposed relative to each other. The interrelation of the dimensions of parts of the supports 5 which mentioned above is still valid for this embodiment.

The blocking elements 2c and 2d are shown in FIGS. 4 and 5 to be engaged with the recesses 4. The arresting body 16, shown in FIG. 4, is provided with a leg spring 8 which urges the arresting body 16 into engagement with the support 5. The leg spring 8c is mounted on a shaft 15 and one leg of the spring 8c abuts a pin 14 so that the pin 14 is rigidly connected to the shaft 15. Another leg of the spring 8c is bent and inserted into an elongated opening 7c or 7d which is provided in the arresting body 16.

Depending upon the direction of pivoting a lever 13 about the shaft 15 the arresting body 16 will move either towards or away from the support 5 and correspondingly the blocking elements 2c and 2d will either move in or out of engagement with the recesses 4 on the support 5. In dependence upon the released position, in which the lower end of the lever 13 will move upwards (as may be seen in FIG. 4) and the blocking elements 2c and 2d will move away from engagement with the recesses 4, the action of arresting the seat proceeds as follows: Upon releasing the actuator the lever 13 pivots downwardly due to a force applied on the lever by a holding spring 19. The pin 14 moves leftwardly jointly with the arresting body 16. Due to the urging force of the spring 8c the pin 14 takes its ultimate position at the right end of the elongated opening 7c (or 7d). Should the lever 13 take its ultimate position, at least one blocking element 2c or 2d then engages a corresponding recess 4 on the support 5. The arresting body 16 is held in this position by the spring 8c, in which one of the blocking elements 2c or 2d engages the support 5, and the other does not. The latter blocking element 2c or 2d will engage the support 5 immediately after the vehicle starts accelerating or decelerating. Only upon engaging this blocking element 2c or 2d with the support 5, the arresting body 16 takes its position corresponding to that shown in FIG. 4, in which both blocking elements engage the support 5 (see FIG. 5), thereby preventing any movement of the movable seat.

Figure 6:
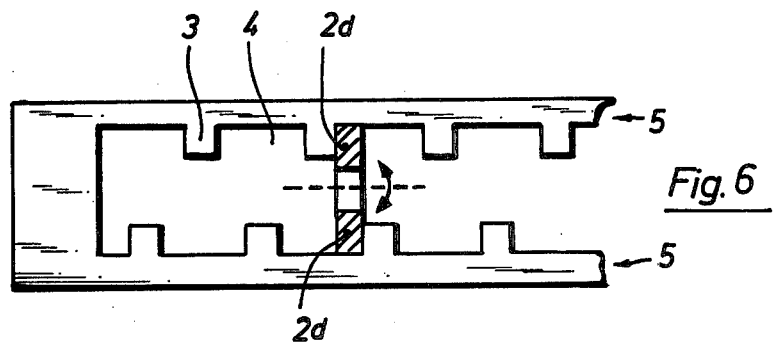
FIG. 6 is a sectional view taken along the line VI—VI on FIG. 5.
Figure 7:
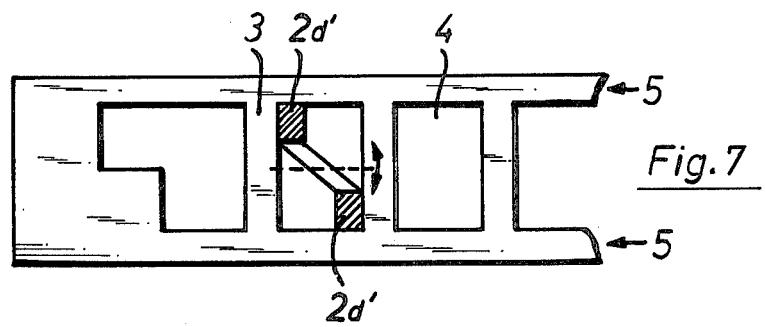
FIG. 7 is a sectional view corresponding to the embodiment shown in FIG. 6.

The blocking element 2c or 2d of the embodiments shown in FIGS. 4, 5 and 6 extends in one and the same plane. The webs 3 of both supports 5 are located phase-oppositely to each other. However, it is also possible to arrange the blocking elements $2d^1$ in two different parallel planes (see FIG. 7). These two planes are spaced from each other in direction lengthwise of the row of recesses 4 by a distance equal to the length of one blocking element measured in the same direction, that is value b plus the length of the web 3, that is value c. If this is the case, the arresting body is provided with two steps, and the webs 3 of both supports 5 are arranged parallel to each other. It is possible to arrange the recesses 4 having rectangular cross-section, so that any two opposite webs can be connected to each other. This fact considerably simplifies the manufacture of the supports 5.

Figure 8:
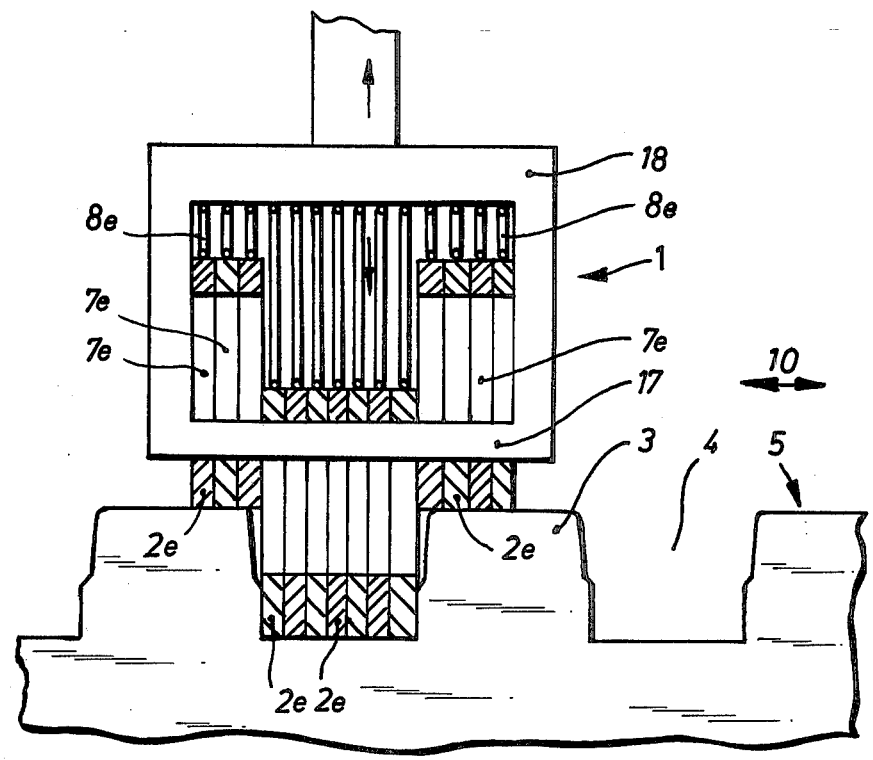
FIG. 8 is a sectional view of a sixth embodiment.

According to another embodiment (FIG. 8) of the present invention, the arresting means include a plurality, for example fourteen, of blocking elements 2e. They are arranged one immediately after another in a set of blocking elements 2. Each blocking element 2e, is provided with a leg spring 8e, which urges the corresponding blocking element 2e into a recess 4 on the support 5. The side surfaces of the blocking elements 2e, which surfaces contact each other are provided with a friction-decreasing material. Each single blocking element 2e has a length in the above-mentioned direction, that is a value b, which is equal to one-seventh of the intermediate distance between two adjacent webs. The overall length of the set of the blocking elements 2e is equal to the period of the webs 3. A bar 17 is inserted through the elongated openings 7e of the blocking elements 2e. The bar 17 is also integrally connected to or of one piece with the actuator 18.

Seven of fourteen blocking elements 2e are in complete engagement with the corresponding recess 4 of the support 5. The rest of the blocking elements 2e are held out of engagement with the recesses 4. In this instance these remaining blocking elements 2e are not required.

Regardless of the relative positions of the set of the blocking elements 2e to the support 5 at least six blocking elements are permanently in engagement with the corresponding recess 4. These six blocking elements can either engage one recess 4, see in FIG. 8, or they can be correspondingly distributed in two adjacent recesses 4. Each recess 4 has an enlarged upper portion at both sides of the support 5 by a dimension substantially exceeding the half of the length of a blocking element 2e. Such a formation renders it possible to decrease a clearance between the blocking element 2e inserted in the recess 4 and the corresponding end face of this recess 4. Due to this any rattle when the blocking elements 2e engage the corresponding recess is eliminated. In accordance with the embodiment shown in FIG. 8, the length of the root of each web corresponds to seven lengths of the blocking element 2e, whereas the length of the crest of each web corresponds to six lengths of the blocking elements 2e.

A complete and clearance-free arresting of the movable seat becomes possible when, for example due to acceleration or deceleration of the vehicle, another seventh blocking element 2e engages the support 5 in addition to those six blocking elements which had already engaged the support 5.

The arresting arrangement can be connected to the vehicle in a kinematically reversed sense. If this is the case, the support 5 is of course not stationary.

It will be understood that each of the elements described above, or two or more together, may also find a useful application in other types of arrangements for arresting a seat of a vehicle differing from the types described above.

While the invention has been illustrated and described as embodied in an arrangement for arresting a seat of a vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for arresting a movable member, particularly a seat of a vehicle, comprising an elongated stationary element having a row of separate recesses which correspond to a plurality of possible positions of the movable member; means for arresting the movable member in a desired position and including a mounting member and at least two blocking elements both mounted on said mounting member and movable jointly to a rest position in which the movable member is free to move lengthwise of said row and each being movable independently of the other and relative to said mounting member to an arresting position in which said blocking elements are inserted in respective ones of said recesses independently of one another to thereby prevent further movement of said movable member; and means for actuating said blocking elements so as to displace them independently of one another and relative to said mounting member from said rest position into said arresting position to arrest the movable member, and to alternately displace them jointly from said blocking position into said rest position to thereby set the movable member free to move.

2. An arrangement as defined in claim 1, wherein said actuating means comprise resilient means normally urging said blocking elements into said arresting position.

3. An arrangement as defined in claim 2, wherein said resilient means comprise at least two springs each urging the corresponding blocking element into said arresting position.

4. An arrangement as defined in claim 3, wherein said row of separate recesses is arranged lengthwise of the path of movement of the movable member.

5. An arrangement as defined in claim 4, wherein said blocking elements are spaced from each other by a first predetermined distance lengthwise of the path of movement of the movable member.

6. An arrangement as defined in claim 5, wherein said blocking elements have the same second predetermined dimensions in direction lengthwise of the path of movement of the movable member.

7. An arrangement as defined in claim 6, wherein said recesses are identical to one another.

8. An arrangement as defined in claim 7, wherein each of said recesses has a third dimension in direction lengthwise of the path of movement of the movable member equal to the sum of the value of two second predetermined dimension of the blocking element and the value of said first predetermined distance between said blocking elements.

9. An arrangement as defined in claim 8, wherein said recesses are separated one from another by a plurality of identical webs having a fourth predetermined dimension in direction lengthwise of the path of movement of the movable member.

10. An arrangement as defined in claim 9, wherein said fourth predetermined dimension is equal of said first predetermined distance.

11. An arrangement as defined in claim 10, wherein said blocking elements are movable in direction substantially normal to the lengthwise movement of said movable member.

12. An arrangement as defined in claim 11, wherein said actuating means are adapted to displace said blocking elements independently of one another to said arresting position in two stages, thus at first inserting one of said blocking elements into a corresponding recess so that the side face of said one blocking element abuts the corresponding side face of said corresponding recess and then inserting another blocking element into said corresponding recess.

13. An arrangement as defined in claim 12, wherein said two blocking elements are integrally connected with one another, and pivotably mounted on a spindle for pivoting about said spindle, said spindle being fixedly mounted parallel to the path of movement of the movable member.

14. An arrangement as defined in claim 13, wherein said blocking elements extend parallel to each other and being spaced from one another by a distance corresponding to the sum of said fourth length of one web plus said second length of one blocking element.

15. An arrangement as defined in claim 1, wherein said arresting means include a set comprising a plurality of said blocking elements adjacent one another, said set having an overall dimension in direction lengthwise of the movement of the movable member at least equal to the sum of a dimension of one recess plus a dimension of one web between two adjacent recesses.

16. An arrangement as defined in claim 15, wherein said actuating means further comprise means for adjusting displacement of said blocking elements into said recesses.

* * * * *